UNITED STATES PATENT OFFICE.

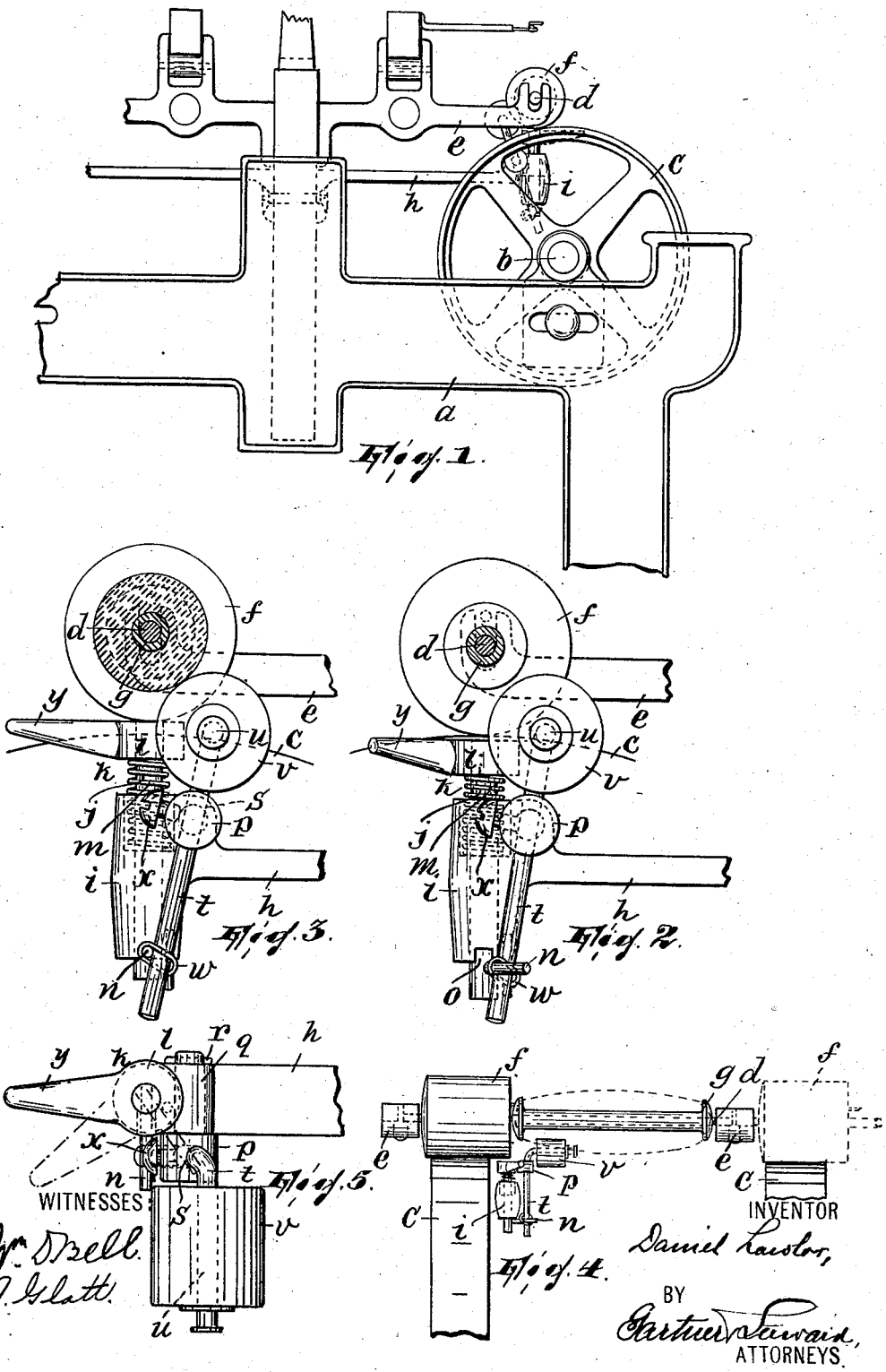

DANIEL LAWLOR, OF PATERSON, NEW JERSEY, ASSIGNOR TO BENJAMIN EASTWOOD CO., OF PATERSON, NEW JERSEY.

STOP-MOTION FOR QUILLING-MACHINES.

No. 867,824.     Specification of Letters Patent.     Patented Oct. 8, 1907.

Application filed June 11, 1906. Serial No. 321,212.

*To all whom it may concern:*

Be it known that I, DANIEL LAWLOR, a citizen of the United States, residing in Paterson, county of Passaic, State of New Jersey, have invented certain new and useful Improvements in Stop-Motions for Quilling-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to stop motion attachments for machines for winding double-headed quills, i. e., quills of the kind, for instance, employed in the shuttles of narrow-ware looms, and it consists in certain improvements, hereinafter pointed out and finally embodied in the clauses of the claim, having for their objects to provide a stop-motion mechanism of this or substantially this nature which shall be simple and inexpensive in construction, effective in operation and accessible and convenient to re-set and otherwise manipulate.

Referring to the accompanying drawings, in which my invention is fully illustrated, Figure 1 is a fragmentary end view of a quilling machine provided with my improved stop-motion attachment; Figs. 2 and 3 show the stop-motion mechanism in the two positions of the parts thereof, Fig. 2 showing the quill in section through the material wound thereon and Fig. 3 showing the quill in section through a plane between the material and the near head of the quill; Fig. 4 is a view in front elevation of one winding unit of the machine and of my attachment; and, Fig. 5 is a top plan view of the attachment.

In the drawings, $a$ is the machine frame; $b$ one of the two rotary shafts carrying series of wheels $c$ for driving the spindles $d$ rotating in brackets $e$ and carrying whirls $f$ resting on said wheels.

$g$ designates the quills, the same being removably arranged on the spindles in the usual manner; each quill has two heads, as shown, and when the material has been built up on the same after the winding it has ubstantially the contour shown in Fig. 4.

$h$ designates one of a series of brackets each of which projects out from the frame $a$ and has a bearing $i$ arranged under one of the whirls $f$; in this bearing, which stands vertically, is arranged the stem $j$ of a dog $k$ whose head $l$ is adapted, upon sufficient upward movement of the dog, to engage the under side of the whirl and so raise the same out of contact with the wheel $c$, whereby to stop the rotation of the spindle. A spiral spring $m$, coiled about the stem $j$ of the dog and arranged between its head and the bearing, normally acts to elevate the dog, this action being however limited by a pin $n$ carried by the stem and engaging either the lower end of the bearing or in a notch $o$ cut therein, according to the position of the pin with relation to said notch.

$p$ is a stud arranged to have some slight rotary movement in a bearing $q$ formed in the bracket $h$, being kept therein by a cotter pin $r$. Said stud stands horizontally and in its head is formed a transverse hole $s$ receiving a lever $t$ having its upper end bent off at right angles to form a bearing $u$ for a roller $v$ which is adapted to be engaged by the material wound on the quill when the bulk thereof is sufficient. The lower end of the lever is coupled with the pin $n$ on the dog by a link $w$, whereby they move substantially together when the dog turns in its bearing. The lever may be adjusted vertically in the stud $p$ by manipulating a set screw $x$ arranged in the stud so as to be set against the lever.

$y$ is a handle formed on the head of the dog as a convenient means for resetting the parts.

Under normal conditions the position of the parts is that shown in Fig. 2 where the pin $n$ is disengaged from the notch $o$ and bears against the lower end of the bearing $i$, the spring $m$ being under tension; at this time, of course, the dog being depressed, the whirl of the spindle is in contact with the wheel $c$ which, being in rotation, causes the material to be wound on the quill. When the bulk of the material wound on the quill attains a given dimension (which, so far as the operation of the stop motion is concerned, is sufficient to cause it to bear against the roller $v$) the lever $t$ moves with the stud $p$ as a fulcrum and, pressing against the pin $n$, turns the dog in its bearing until the pin registers with the notch $o$, whereupon the dog is free to move upwardly to raise the whirl out of contact with the wheel $c$. The parts are re-set by grasping the handle $y$ and turning the dog, after depressing the same, until the pin $n$ clears the notch $o$.

It will be observed that the arrangement and construction of the parts are such that the lever, upon adjustment in the stud longitudinally, may be made to accommodate itself to the formation of various sized cops; that is to say, a cop of any predetermined diameter may be formed according as the roller $v$ stands more or less elevated.

Having thus fully described my invention, what I claim as new and desire to secure by Letters Patent is:

1. In a quilling machine, the combination, with a supporting structure, of a spindle driving wheel, a spindle adapted to be driven from said wheel and movable to and from the same, and mechanism for automatically disengaging the spindle from the wheel upon a predetermined amount of material being wound on the quill carried by the spindle comprising a longitudinally movable spring-pressed dog, means for normally holding the dog retracted, and a lever fulcrumed in said structure and operative from the material being wound on the quill, for releasing said dog from its holding means, substantially as described.

2. In a quilling machine, the combination, with a supporting structure, of a spindle driving wheel, a spindle adapted to be driven from said wheel and movable to and from the same, and mechanism for automatically disengaging the spindle from the wheel upon a predetermined amount of material being wound on the quill carried by said spindle comprising a longitudinally and rotatively movable spring-pressed dog having a projecting part normally engaged with a part of said supporting structure to hold the dog retracted, and means, operative from the material being wound on the quill, for rotating said dog and thereby releasing it from the retaining part of said structure, substantially as described.

3. In a quilling machine, the combination, with a supporting structure, of a spindle driving wheel, a spindle adapted to be driven from said wheel and movable to and from the same, and mechanism for automatically disengaging the spindle from the wheel upon a predetermined amount of material being wound on the quill carried by said spindle comprising a longitudinally and rotatively movable spring-pressed dog having a projecting part normally engaged with a part of said supporting structure to hold the dog retracted, and a lever fulcrumed in said structure, adapted to be actuated from the material being wound on said quill, and projecting into engageable proximity to said dog, whereby to rotate said dog and thus effect the release thereof from the retaining part of said structure, substantially as described.

4. In a quilling machine, the combination, with a supporting structure, of a spindle driving wheel, a spindle adapted to be driven from said wheel and movable to and from the same, and mechanism for automatically disengaging said spindle from the wheel upon a predetermined amount of material being wound on the quill carried by the spindle comprising a movable dog adapted to move said spindle out of contact with the wheel, a stud rotatively arranged in said structure, and a lever adjustably arranged in said stud and engageable at one end with said dog and having its other end extending into operative proximity to the material being wound on the quill whereby to be actuated therefrom and so actuate the dog, substantially as described.

In testimony, that I claim the foregoing, I have hereunto set my hand this 29th day of May, 1906.

DANIEL LAWLOR.

Witnesses:
JOHN W. STEWARD,
WM. D. BELL.